US012202322B2

(12) United States Patent
Rossi et al.

(10) Patent No.: US 12,202,322 B2
(45) Date of Patent: Jan. 21, 2025

(54) TONNEAU COVER AND ADJUSTABLE FRAME FOR A PICKUP TRUCK

(71) Applicant: WORKSPORT LTD., Vaughan (CA)

(72) Inventors: Steven Rossi, Vaughan (CA); Ajeethkumar Angappan, Scarborough (CA)

(73) Assignee: WorkSport Ltd., Richmond Hill (CA)

( * ) Notice: Subject to any disclaimer, the term of this patent is extended or adjusted under 35 U.S.C. 154(b) by 152 days.

(21) Appl. No.: 17/896,287

(22) Filed: Aug. 26, 2022

(65) Prior Publication Data

US 2023/0065116 A1    Mar. 2, 2023

Related U.S. Application Data

(60) Provisional application No. 63/237,204, filed on Aug. 26, 2021.

(51) Int. Cl.
*B60J 7/14* (2006.01)
*B60J 7/10* (2006.01)

(52) U.S. Cl.
CPC .............. *B60J 7/141* (2013.01); *B60J 7/102* (2013.01)

(58) Field of Classification Search
CPC ..... B60J 7/102; B60J 7/141; B60J 7/16; B60J 7/1607; B60P 7/04
USPC ....................................... 296/100.17, 100.18
See application file for complete search history.

(56) References Cited

U.S. PATENT DOCUMENTS

| | | | | |
|---|---|---|---|---|
| 2,947,566 A | * | 8/1960 | Tower | B60R 9/00 296/10 |
| 4,813,734 A | * | 3/1989 | Hoover | B60J 7/102 296/102 |
| 5,143,415 A | * | 9/1992 | Boudah | B60R 9/00 224/325 |
| 10,005,347 B1 | * | 6/2018 | Singer | B60J 7/041 |
| 10,399,420 B2 | | 9/2019 | Rossi | |
| 10,596,887 B2 | | 3/2020 | Rossi et al. | |
| 2003/0071098 A1 | * | 4/2003 | Martin | B60R 9/00 224/558 |
| 2016/0039274 A1 | * | 2/2016 | Smith | B60J 7/102 296/100.18 |

* cited by examiner

*Primary Examiner* — Jason S Daniels
(74) *Attorney, Agent, or Firm* — Honigman LLP; Eric J. Sosenko; Jonathan P. O'Brien

(57) ABSTRACT

A tonneau cover frame for use with a bed of a pickup truck. The frame including a plurality of side rails, a plurality of end rails and a plurality of cross rails. The side rails being configured for extending along sides of the bed of the pickup truck, the end rails extending between the side rails adjacent to front and rear ends of the frame, and the cross rails extending between the side rails at a location between the front and rear ends of the frame. The plurality of end rails and the plurality of cross rails each having an adjustable length, whereby the frame is adjustable in width for use in connection with differently sized beds of different pickup trucks.

14 Claims, 12 Drawing Sheets

TONNEAU COVER AND ADJUSTABLE FRAME FOR A PICKUP TRUCK

BACKGROUND

1. Field of the Invention

The present invention generally relates to tonneau covers used in covering the cargo boxes of pickup trucks. More particular, the present invention relates to such tonneau covers and the frames used in connection therewith.

2. Description of Related Technology

Tonneau covers are used to cover the cargo boxes or beds (hereafter just "beds") of pickup trucks for aesthetics and to protect any contents located in the bed from ejection and/or environmental factors, such as rain, dirt, snow and debris.

While various styles of tonneau covers exist, one of the most popular styles is a foldable tonneau cover. A foldable tonneau cover is desirable because, when not required to cover the bed of the pickup truck, the tonneau cover may be folded toward the rear of the cab of the truck, leaving at least a portion of the bed open and uncovered.

Foldable tonneau covers themselves come in soft fold tonneau covers and hard fold tonneau covers. Soft fold tonneau covers employ a foldable frame having typically three or more sections defined by side frame members and transverse frame members, the latter of which extend between the side frame members. Additional transverse members, sometimes referred to as cross bows, may be provided between the transverse frame members. The sections of the frame are connected by hinge systems that allow the sections to fold as noted above. A cover or tarp of a flexible material is retained over the entire foldable frame.

When being folded, generally, the rearmost section of the tonneau cover is folded forward, toward the passenger cabin or cab (hereafter "cab"), and on top of the next rearmost section of the tonneau cover. These two sections are then together folded forward onto the next rear most section of the tonneau cover. This folding procedure is continued until all of the sections of the tonneau cover are folded top of one another forming a stack of tonneau cover sections adjacent to the cab of the pickup truck. In this stack, the section of the unfolded tonneau cover located closest to the cab ultimately forms the bottom of the stack. A representative construction of a soft fold tonneau cover is disclosed in U.S. Pat. No. 10,399,420, which is herein incorporated by reference.

A hard fold tonneau cover includes rigid panel sections interconnected by hinge systems that allows the tonneau cover to generally fold in the same manner as previously described. Accordingly, the rigid panels sections can be folded forwardly, one on top of another, until forming a stack adjacent to rear of the cab of the truck. A representative construction of a hard fold tonneau cover is disclosed in U.S. Pat. No. 10,596,887, which is herein incorporated by reference.

A third style of tonneau cover is the clam shell tonneau cover. With a clam shell tonneau cover, the tonneau cover cannot fold. Rather, the tonneau cover is pivotally mounted near the passenger cabin of the truck so that it can be lifted at the tailgate to allow for access into the bed of the truck.

In order to retain the tonneau covers on the bed of the pickup truck, the tonneau cover includes latches and/or clamps that are typically, but not necessarily, located adjacent the four corners of the tonneau cover. Latches are used where it is desirable to be able to quickly and easily release the tonneau cover from the bed, such as near the tailgate for folding. One common type of latch is an over-center cam latch that hooks onto a downwardly projecting flange of the sidewall of the bed of the truck. Clamps are typically used where the tonneau cover does not need to be easily disengaged from the bed, such as near the cab. Clamps may use threaded fasteners to secure a jaw with the flange of the sidewall.

Other styles of tonneau covers include roll-up tonneau covers and retractable tonneau covers. With the former, the cover can be rolled up, starting adjacent to the tailgate, to open the bed of the truck. Retractable tonneau covers also roll up, but roll onto a roller located adjacent to the cab.

As will be appreciated, different trucks have different sized beds and different sized sidewalls that define their beds. Accordingly, a particular tonneau cover will only mount to a limited number of different trucks. As a result, manufacturers must provide a wide variety of different tonneau cover sizes. Additionally, when shipping the tonneau covers, the tonneau covers are large and bulky and a wide variety of shipping containers, boxes, must be employed, even when shipping folding tonneau covers.

By virtue of being foldable, folding tonneau covers reduce the size of the tonneau cover for shipping purposes. By folding the tonneau cover into a stack, the length of the tonneau cover is reduced by approximately ⅓ or more. The width of the tonneau cover, however, is still generally in the range of about 157 to 183 cm (62 to 72 inches), based on a full sized pickup truck. The folded tonneau cover therefore requires a shipping box whose length is greater than the width of the tonneau cover. Since shipping costs are calculated on both the size and weight of the boxed and shipped item, the width of tonneau covers significantly influences their shipping costs.

SUMMARY OF THE INVENTION

In overcoming the enumerated drawbacks and other limitations of the related art, the present invention provides a tonneau cover for use with a wide range of pickup truck beds.

In one aspect, the invention provides a tonneau cover frame that is adjustable in at least one of its length or width In another aspect, the invention provides for a tonneau cover frame for use with a bed of a pickup truck. The frame includes a plurality of side rails, the side rails being configured for extending along sides of the bed of the pickup truck; a plurality of end rails, the end rails extending between the side rails adjacent to front and rear ends of the frame; and a plurality of cross rails, the cross rails extending between the side rails at a location between the front and rear ends of the frame; and the plurality of end rails and the plurality of cross rails each having an adjustable length. Resultingly, the frame is adjustable in width for use in connection with differently sized beds of different pickup trucks.

In another aspect, at least one of the end rails or one of the cross rails includes an inner member and an outer member, the inner and outer members being in telescoping engagement with one another.

In a further aspect, at least one of the end rails or one of the cross rails includes two inner members and one outer member, the two inner members being engaged with opposing ends of the outer member.

In an additional aspect, the end rails and the cross rails each include an engagement member, the engagement members selectively fixing the length of the end rails and cross rails.

In yet another aspect, the engagement member is carried by a first portion of the end and cross rails and fixedly engages a second portion of the end and cross rails.

In still a further aspect, the engagement member is a detent.

In another aspect, the plurality of side rails each have an adjustable length, whereby the frame is adjustable in length and width.

In yet a further aspect, each of the side rails includes an inner member and an outer member, the inner and outer members being in telescoping engagement with one another and selectively positionable in at least first and second lengths.

In an additional aspect, the frame is moveable between an extended position covering the bed of the pickup truck and a folded positon wherein panels sections of the frame are folded one a top another.

In still another aspect, each panel section includes one of the side rails, and side rails of adjacent panel sections are connected by hinges.

In yet a further aspect, each of the side rails includes an inner member and an outer member, the inner and outer members being in telescoping engagement with one another and selectively positionable in at least first and second lengths.

In another aspect of the invention, provided is a tonneau cover frame for use with a bed of a pickup truck. The frame includes a plurality of side rails, a plurality of end rails and a plurality of cross rails. The side rails are configured to extend along sides of the bed of the pickup truck while the end rails extend between the side rails adjacent to front and rear ends of the frame. The end rails each including end rail length adjustment means for selectively adjusting the end rails in length. The plurality of cross rails extended between the side rails at location between the front and rear ends of the frame, and the cross rails include cross rail length adjustment means for selectively adjusting the cross rails in length. As a result, the frame is adjustable in width for use in connection with differently sized beds of different pickup trucks.

In another aspect of the invention, the plurality of end rails and the plurality of cross rails are telescoping rails selectively positionable in at least first and second lengths.

In a further aspect, the side rails include side rail length adjustment means for selectively adjusting the side rails in length.

In an additional aspect, the side rails are telescoping rails selectively positionable in at least first and second lengths.

In another aspect, a tonneau cover assembly is provided for use with a bed of a pickup truck. The tonneau cover assembly including a frame having a plurality of side rails and being configured for extending along the sides of the bed of the pickup truck; a plurality of end rails, the end rails extending between the side rails adjacent to front and rear ends of the frame; and a plurality of cross rails, each of the cross rails extending between the side rails at a location between the front and rear ends of the frame. At least one of the plurality of side rails or the plurality of end rails and cross rails has an adjustable length. Resultantly, the frame is adjustable in width and/or length for use in connection with differently sized beds of different pickup trucks. The invention further includes a cover, the cover being of fixed length and width.

In another aspect, at least one of the end rails or one of the cross rails includes an inner member and an outer member, the inner and outer members being in telescoping engagement with one another and being selectively positionable in at least first and second lengths.

In a further aspect, the plurality of side rails each have an adjustable length, whereby the frame is adjustable in length and width.

In an additional aspect, the side rails include an inner member and an outer member, the inner and outer members being in telescoping engagement with one another and being selectively positionable in at least first and second lengths.

In another aspect, the side rails include an adapter block engaged between the inner member and the outer member and preventing relative movement therebetween Further objects, features and advantages of this invention will become readily apparent to persons skilled in the art after a review of the following description, including the claims, and with reference to the drawings that are appended to and form a part of this specification. It will be appreciated that the foregoing summary sets out representative aspects of a tonneau system to assist skilled readers in understanding the following detailed description.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an axis is designated in the figures. An axial surface is therefore one that faces in the axial direction, along the central axis. A radial surface therefore faces radially, generally away from or toward the central axis. It will be understood, however, that in actual implementation, the directional references used herein may not necessarily correspond with the installation and orientation of the corresponding components or device. When discussed in connection with a truck, "forward" is a direction toward the cab, "rearward' is a direction toward the tailgate, "transverse" or "lateral" is a direction toward a side of the truck, generally, but not necessarily, perpendicular to the forward and rearward directions.

Figure 1:
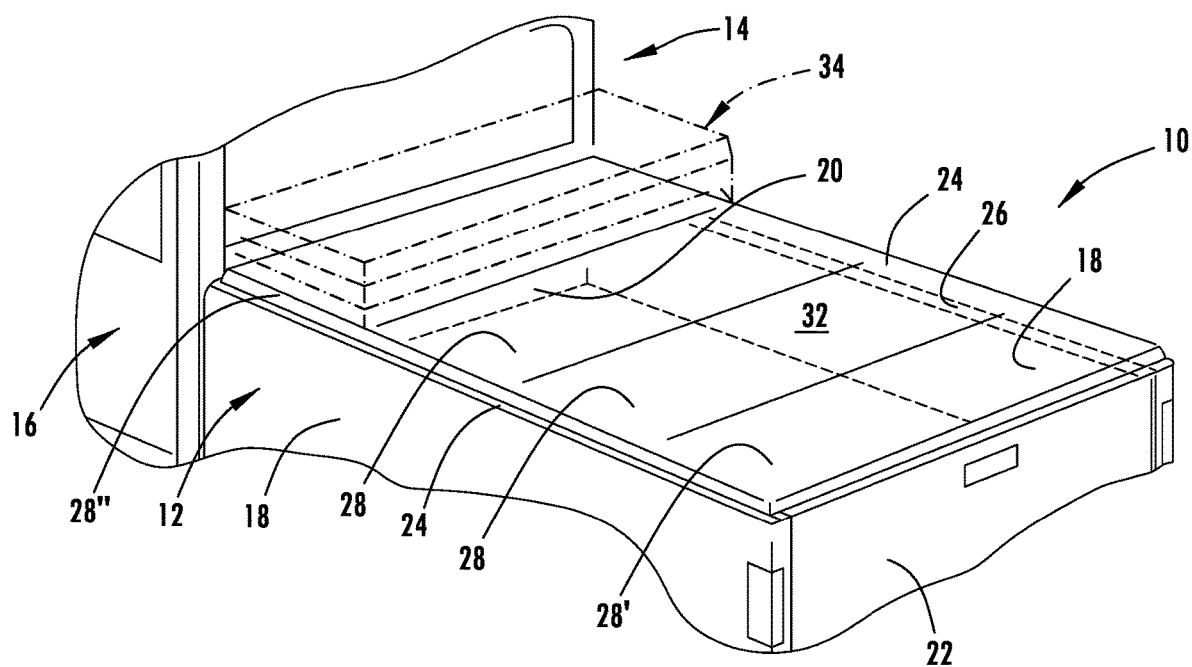
FIG. 1 is a perspective view of a tonneau cover and frame, embodying the principles of the present invention, mounted on a pickup truck and covering the bed of the truck, while also showing in phantom the tonneau cover in its folded condition.

Referring now to the drawings, a tonneau cover embodying the principles of the present invention is generally illustrated in FIG. 1 and designated at 10. The tonneau cover 10 is shown as being mounted to the bed 12 of a pickup truck 14 so as to cover or enclose the bed 12. The bed 12 is located rearward of the passenger cabin or cab (hereafter "cab") 16 and includes a pair of opposed sidewalls 18 joined at their forward and rearward ends by a front wall/bulkhead 20 and rear wall/tailgate 22, respectively. The tops of the sidewalls are typically reinforced and define bed rails 24 that include, on their laterally inward sides, a downwardly projecting flange 26.

As previously mentioned, tonneau covers themselves come in variety of different styles. As described herein, the invention is embodied in a soft fold tonneau cover. However, it will be appreciated that the invention is not limited to that embodiment and may be used in other varieties of tonneau covers. Accordingly, as described below, a reference to a tonneau cover 10 is generic to all types of tonneau covers, unless the language or context of the description specifically requires a different interpretation or the description otherwise indicates to the contrary.

As seen in FIG. 1, the tonneau cover 10 is mounted to the bed 12 of a pickup truck 14 and may include one or more sections. As illustrated therein, the tonneau cover 10 is a soft fold tonneau cover having four tonneau sections, designated as tonneau sections 28, with section 28' being located closest or adjacent to the tailgate 22 and section 28" being located closest or adjacent to the bulkhead 20. The tonneau cover 10 includes a frame 30, which is representatively shown in FIGS. 2 and 3, but not seen in FIG. 1. A cover 32 of flexible material, such as polyester backed vinyl, extends over and is retained on the frame 30.

As illustrated in FIG. 1, the tonneau cover 10 is in its unfolded position. In this position, the tonneau cover 10 is fully extended over and covers the bed 12 of the pickup truck 14. The folded position of the tonneau cover 10 is also illustrated in FIG. 1. This is representatively shown in dash-dot lines with the tonneau sections 28 being folded on top of one another and forming a stack 34.

When folding the tonneau cover 10 from its extended/unfolded position into its folded position, the section 28' adjacent to the tailgate 22 is first folded on top of the immediately adjacent intermediate section 28. Next, these two sections 28, 28' are folded on top of the next intermediate section 28. Finally, all three of these sections are folded on top of the section 28" adjacent to the bulkhead 20 or cab 16 to form the stack 34. In the stack 34 of tonneau sections 28, the tonneau sections 28" forms the bottom of the stack 34.

Figure 2:
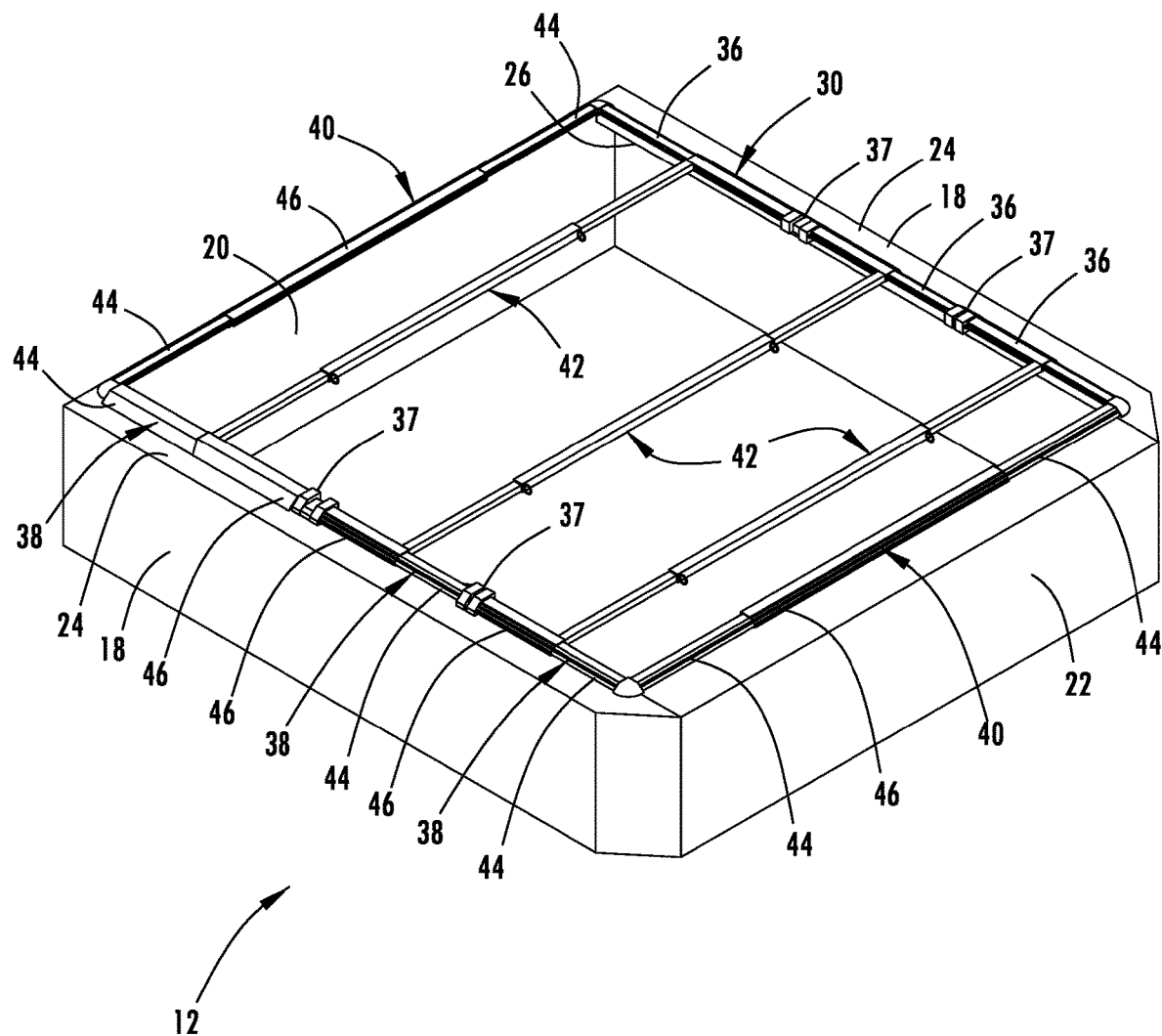
FIG. 2 is a perspective view of the frame of the tonneau cover seen in FIG. 1 illustrating the frame positioned on the bed of a pickup truck, the bed being shown in isolation from other features of the pickup truck.
Figure 3A:
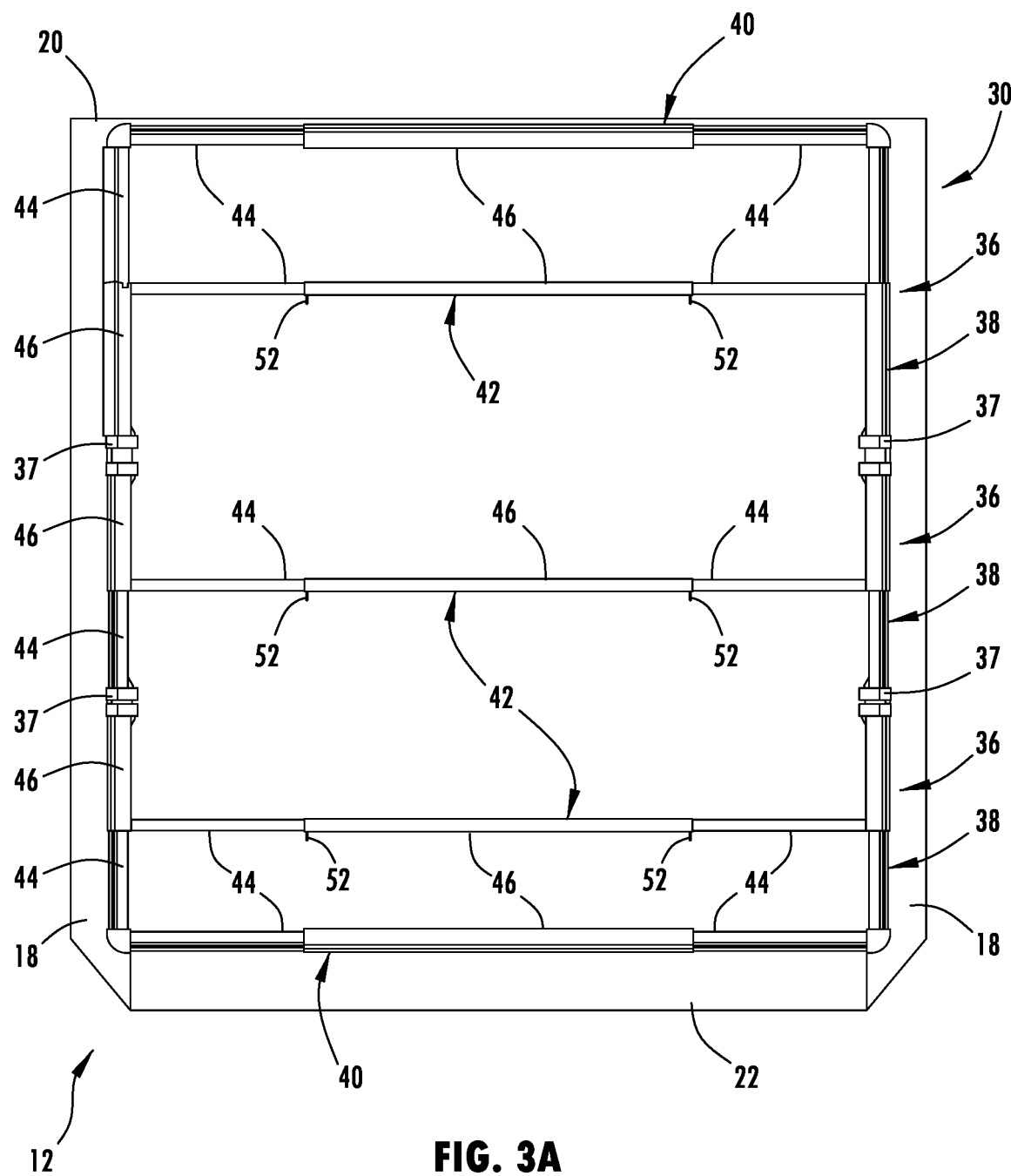
FIG. 3A is a top plan view of the frame and bed seen in FIG. 2.

As mentioned above and as will be readily appreciated, the tonneau cover 10 of FIG. 1 is shown with four section 28, but may have more or less than four sections 28. As represented in FIGS. 2 and 3A/B, the tonneau cover 10 includes three sections 28.

Referring now to FIG. 2, the frame 30 of the tonneau cover 10 is representatively illustrated therein and positioned on the bed 12 of the pickup truck 14 such that the frame 30 rests on top of the bed rails 24, the bulk head 20 and the tailgate 22. The frame 30 includes three sub-frames 36, one corresponding to each of the tonneau sections 28, 28' and 28". Each sub-frame 36 is connected to the adjacent sub-frame 36 by a hinge 37 that allows the frame 30 to fold as discussed above.

The frame 30 and sub-frames 36 are formed by three basic members, side rails 38, end rails 40 and cross rails 42. The side rails 38 extend along and rest upon the bed rails 24 of the bed 12. The end rails 40 extend along and rest upon the bulkhead 20 and tailgate 22, between the side rails 38 of the front-most and rear-most sub-frames 36. The cross rails 42 extend between opposing the side rails 38 of each of the sub-frames 36. Each sub-frame 36 incudes at least one cross rail 42. It will be appreciated that both the end rails 40 and cross rails 42 are transverse rails extending laterally relative to a central axis through the front and rear of the pickup truck 14.

Figure 3B:
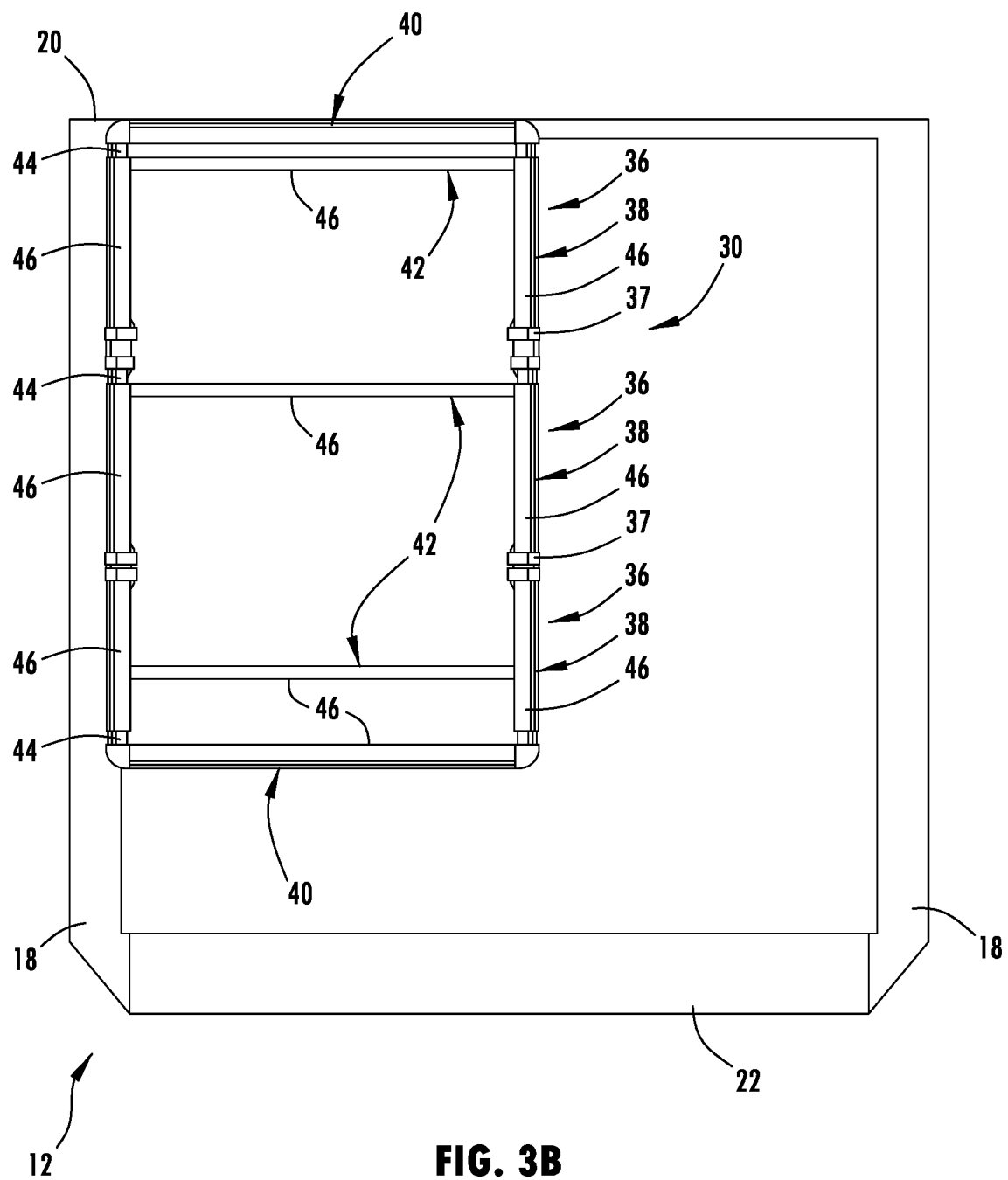
FIG. 3B is a top plan view, similar to FIG. 3A, of the frame in a fully retracted condition and shown relative to the bed.

Unlike prior tonneau covers, the present tonneau cover 10 and frame 30 have a construction that permits a "knock-down" configuration that not only allows the tonneau cover 10 and frame 30 to be shipped in smaller packaging, but also allows the tonneau cover 10 and frame to be assembled by the end user and allows for a single frame 30 to be employed with a wide variety, if not all, sizes of pickup trucks and not just a few. With regard to this latter feature, the frame 30 is adjustable in both its length and its width. Thus, only a specific sized cover 32 is required for a particular pickup truck 14. As seen in FIG. 3A, the frame 30 is extended and corresponds in size to the bed 12 of a pickup truck 14. In FIG. 3B, however, the frame 30 is shown in its fully retracted condition, which is substantially smaller (approximately 44% smaller along its width and 30% smaller along its length) than its fully extended condition.

To enable the knock-down configuration, the rails 38, 40, 42 of the frame 30 are each composed of telescoping members that can be selectively fixed to one another to define a specific length and width for the particular pickup truck 14 of the end user. As such the rails 38, 40, 42 have a wide adjustability in their lengths. Since both the side rails 38 and the transverse rails 40, 42 are adjustable, the frame 30 is adjustable in both its width and length, allowing one frame 32 to be configured for either full or compact pickup trucks. Alternatively, only one of the width or length may be provided as adjustable.

Figure 4:
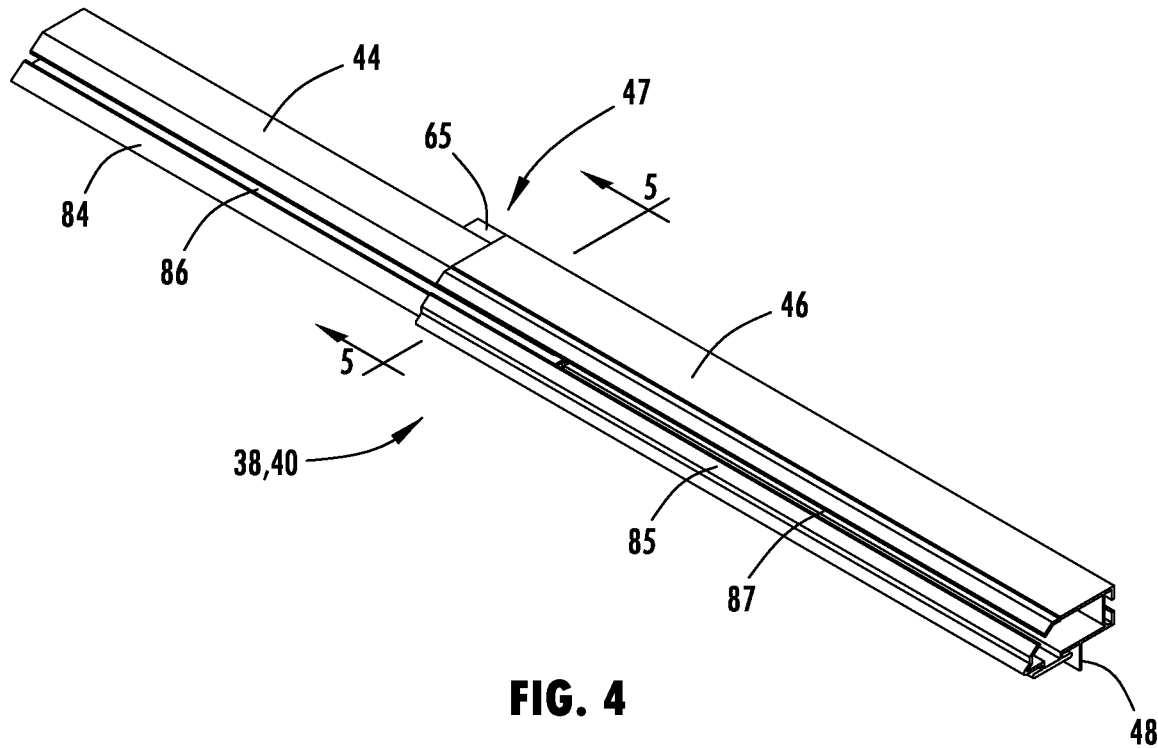
FIG. 4 is a perspective view of a telescopic side rail of the frame seen in FIGS. 2 and 3A.
Figure 5:
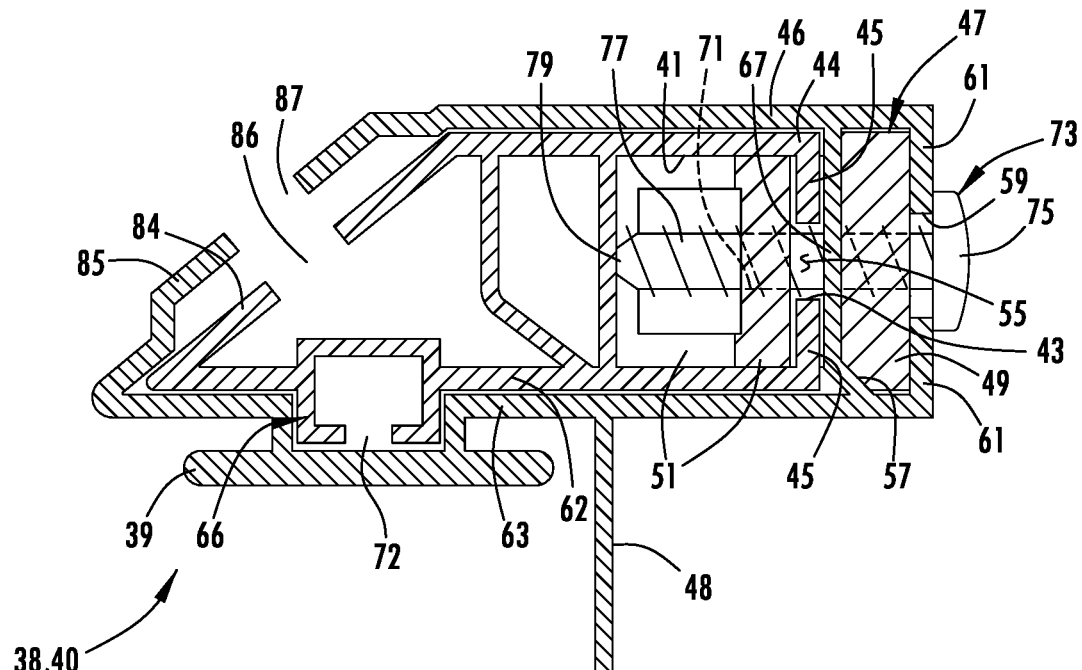
FIG. 5 is a cross sectional view of the inner and outer members of the side rail seen in FIG. 4.

FIGS. 4 and 5 illustrate the telescoping members 44, 46 of the side rails 28 and end rails 40. As seen therein, the telescoping members include an inner member 44 and an outer member 46, each of which is an extrusion having a corresponding exterior or interior shape that allows it to be respectively received into or over the other telescoping member 44, 46 and to adjustably slide along the respective telescoping member 44, 46. While each rail 38, 40, 42 may be composed of two telescoping members 44, 46, the rails 38, 40, 42 may be composed of more than two members 44, 46. As seen in FIGS. 3 and 4, the side rails 38 are composes of two telescoping members 44, 46, while the end rails 40 and the cross rails 42 are composed of three telescoping members, namely two inner members 44 and one outer member 46, the latter of which is located between the inner members. Accordingly, the rails 38, 40, 42 may be composed of two or more members.

While the shape of the side rails 38 is more fully discussed below, it is noted that the extrusion forming the outer member 46 of the side rails 38 is additionally provided with a projecting profile or flange 48 (see FIGS. 4-6) extending downwardly (approximately 90°) from the lower wall of the outer member 46. The flange 48 is used in positioning the side rails 38 against the bed rails 24 on the opposing sides of the bed 12, allowing the width of the frame 30, and therefore the length of the end rails and cross rails 40, 42, to be readily determined and easily set, as well as ensuring a secure installation on the bed 12. center of gravity of the side rails 38 is located laterally outboard of the flange 48 to allow the side rails 38 to rest on the top of the bed rails 24, when placed thereon, without falling into the bed 12. Notably, the flange 48 may be omitted on the end rails 40 and is not provided on the cross rails 42.

Once the inner and outer members 44, 46 of the end and cross rails 40, 42 have been extended to the desired length, establishing the desired width of the frame 30 for the pickup truck 14, the members 44, 46 may be secured in this position through the use of a detent or similar engagement device for holding the relative positions of the members 44, 46 until released. As illustrated herein the detent is in the form of a detent spring 52 that engages in index holes 54 provided on the inner and outer members 44, 46. While illustrated as a spring detent, it will be appreciated that the present invention is not limited thereto. Other detents and other types of fastening means may be used, including, without limitation spring and ball detents, magnetic detents, detent pins (also known as cotterless pins) and other types of fasteners, such as nuts and bolts, screws, plungers, pins and cotters/catches or even an over-center cam latch mechanism allowing for more infinite adjustment, particularly of the cross rails 42.

Figure 6:
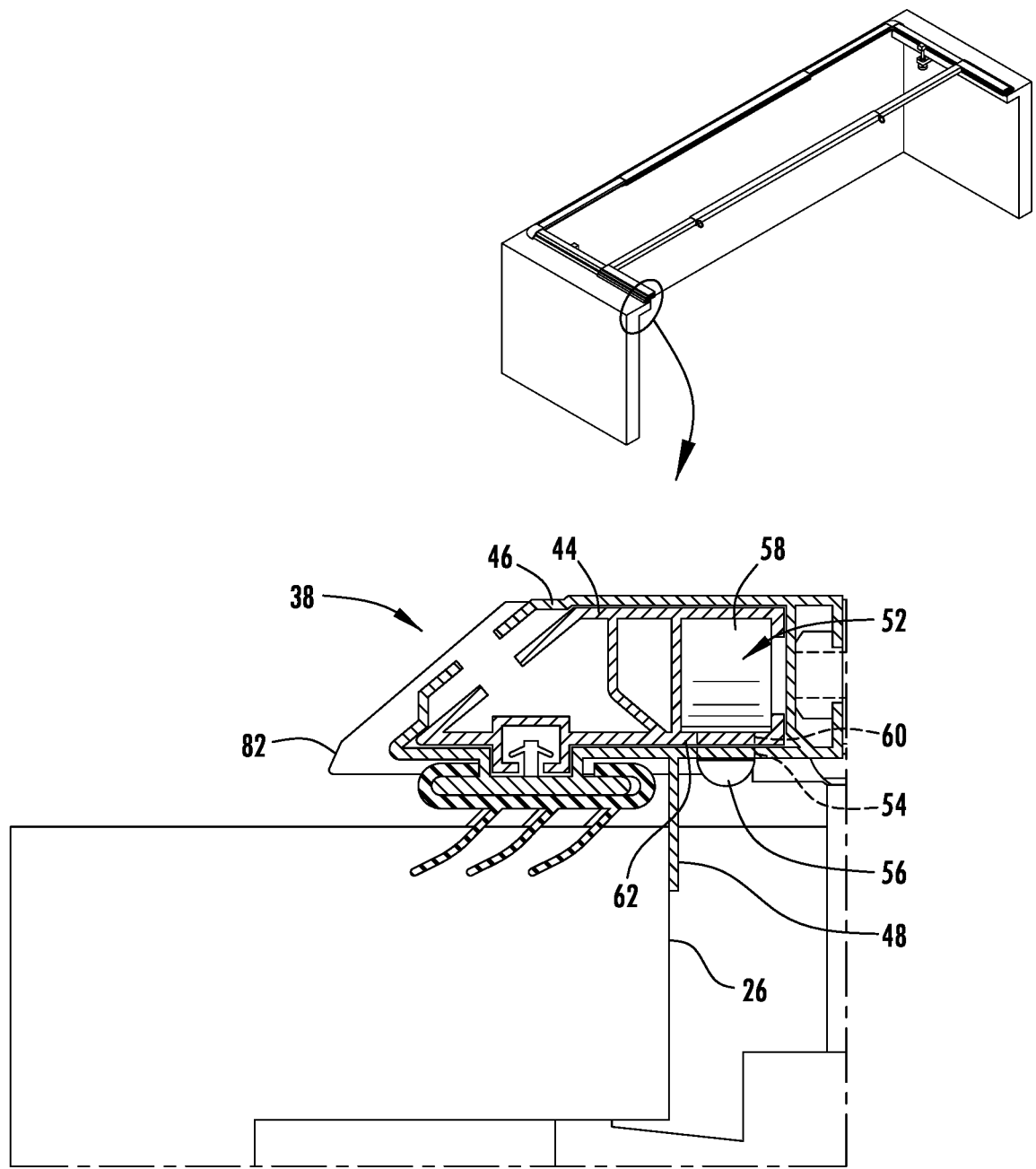
FIG. 6 is a cross sectional view illustrating the telescoping members of a side rail and a mechanism for retaining the members in position, as well as a profile of the extrusion for use in setting the width of the frame.
Figure 7A:
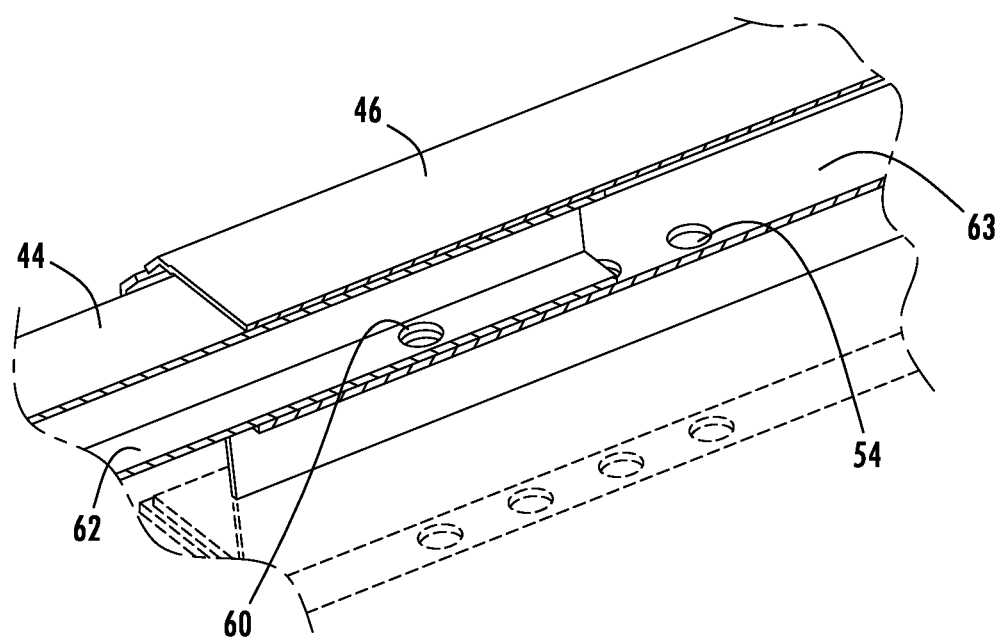
FIG. 7A is a longitudinal cross section of a rail, representative of all the rails of the frame, showing the telescoping relationship of the rails and the various holes that may be used to retain the members in position relative one another.
Figure 7B:
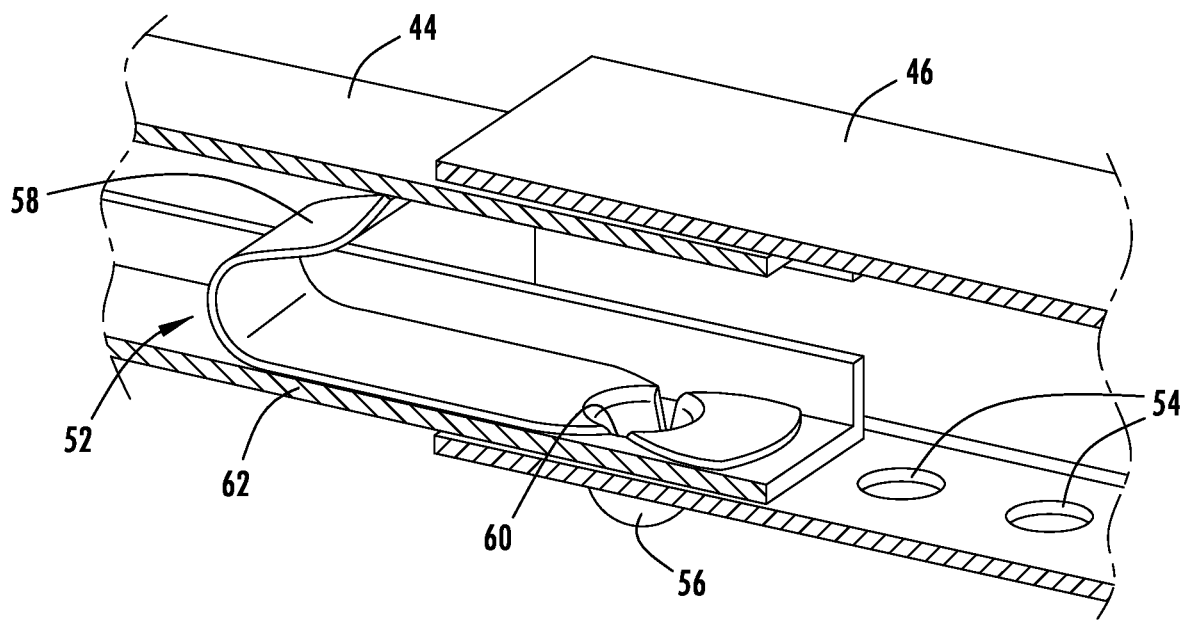
FIG. 7B is a longitudinal cross section of a rail, representative of all the rails of the frame, further showing further aspects of a mechanism for retaining the members in position.
Figure 8:
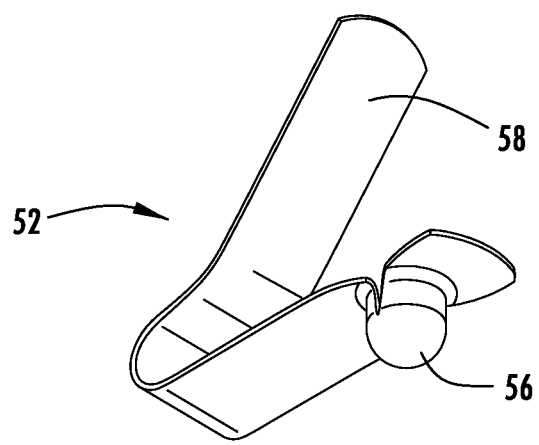
FIG. 8 is a perspective view of the detent spring seen in FIG. 7B.
Figure 10:
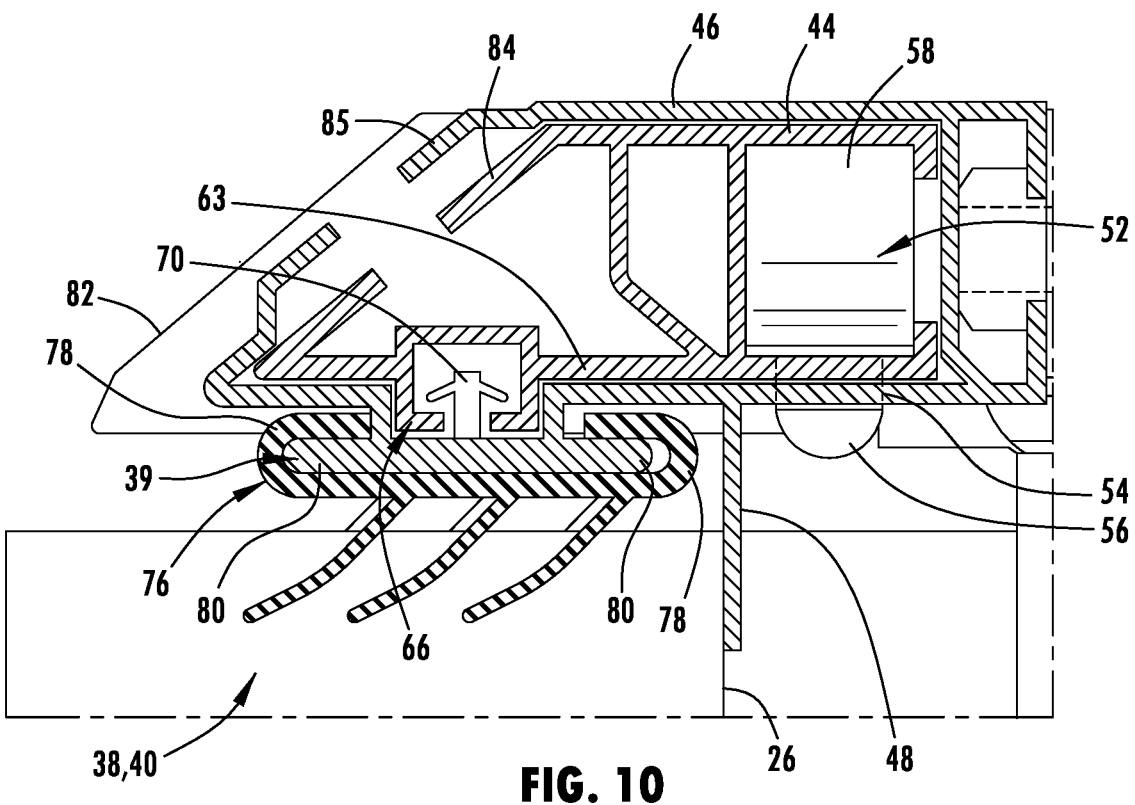
FIG. 10 is a cross sectional view showing a seal mounted to the outer member of a side or end rail, with the seal mounted to the inner member there behind.
Figure 11:
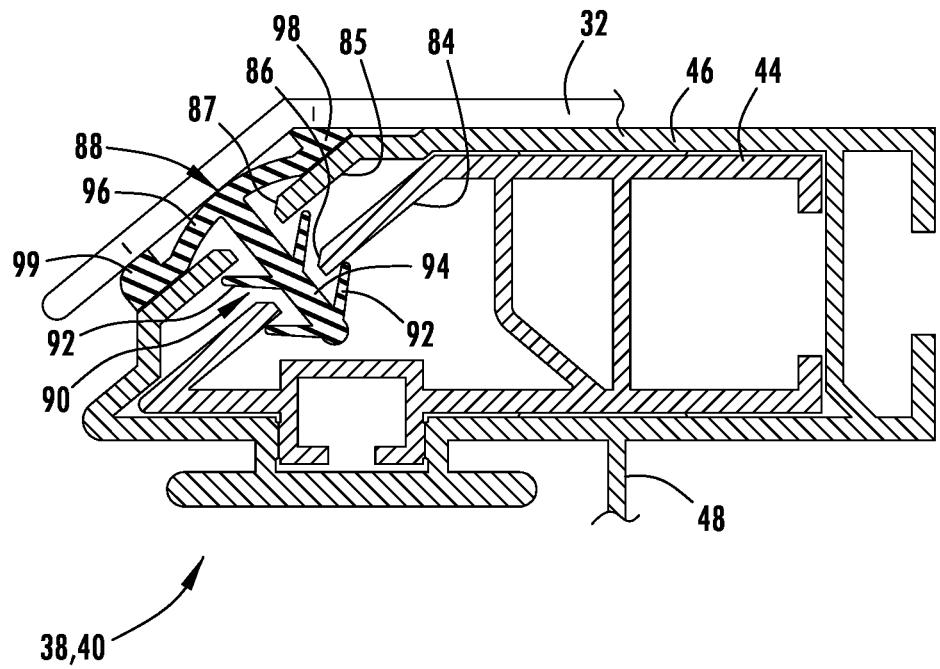
FIG. 11 is a cross sectional view showing a fastener used for securing a cover to the frame.

In FIGS. 6, 7B and 10 the detent pin 52 and index holes 54 are illustrated in relation to the inner and outer members 44, 46 of a side rail 38. It will be appreciated, however, that the construction is equally applicable to the end and cross rails 40, 42, which, along with the side rail 38, is representatively shown in FIG. 7B. As seen in these figures, the inner and outer members 44, 46 are shown in various cross sections to expose the detent springs 52 and index holes 54. The detent springs 52 are provided within an inboard channel 41 defined by the inner member 44 of the respective rails and the index holes 54 are provided in the outer member 46 of the respective rails. The channel 41 has a laterally facing opening 43 between opposed legs 45 and, therefore, generally defines a T-slot on the laterally inboard side of the inner member 44.

The detent spring 52 is illustrated as a stamped and bent spring metal which forms a button 56 and a spring leg 58. The button 56 extends through a pilot hole 60, seen in FIG. 7A, in a lower wall 62 of the inner member 44. The spring leg 58 engages the opposing/upper wall 64 to bias the button 56 into the pilot hole 60 and into one of the index holes 54 defined in the outer member 46.

With the frame 30 properly sized to the bed 12 of the pickup truck 14, the inner and outer members 44, 46 of the side rails 38 and end rails 40, as well as the cross rails 42, may be additionally secured together, thereby rigidifying the members and reducing or eliminating rattle or noise therebetween. To achieve this rigidifying of the inner and outer members 44, 46, an adapter block 47 is provided in each end, of the outer members 46, that receive an inner member 44 therein to.

Figure 14:
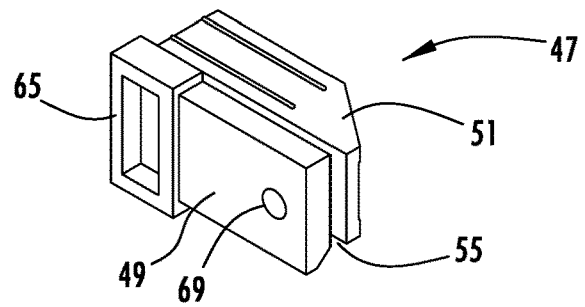
FIG. 14 is a perspective view of an adapter block used in fixing the outer and inner members of the side and end rails together.
Figure 15:
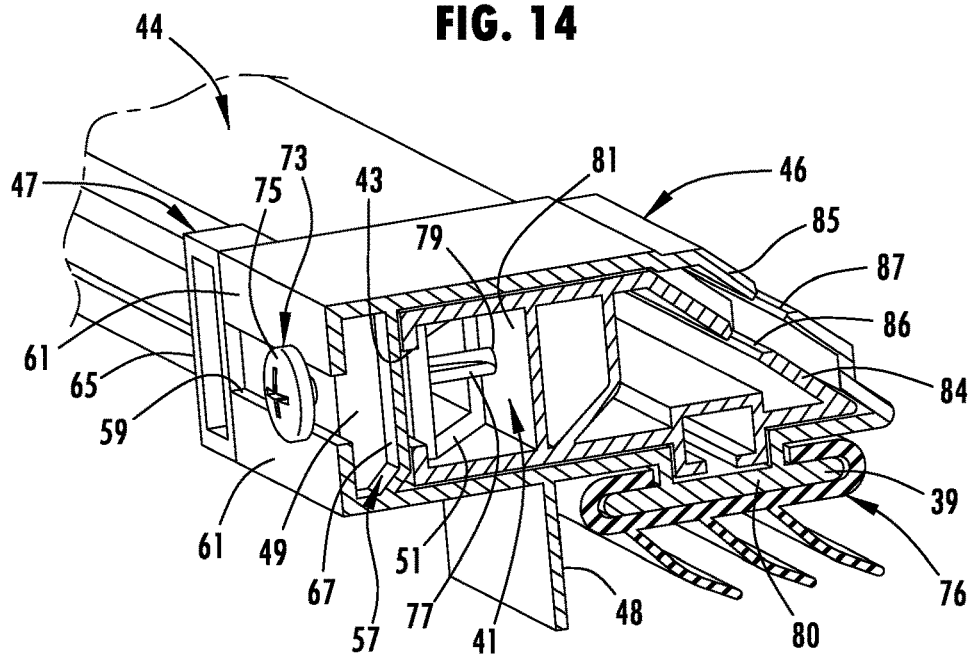
FIGS. 15 and 16 are partial sectional views of the adapter block fixing the inner member to the outer member.
Figure 16:
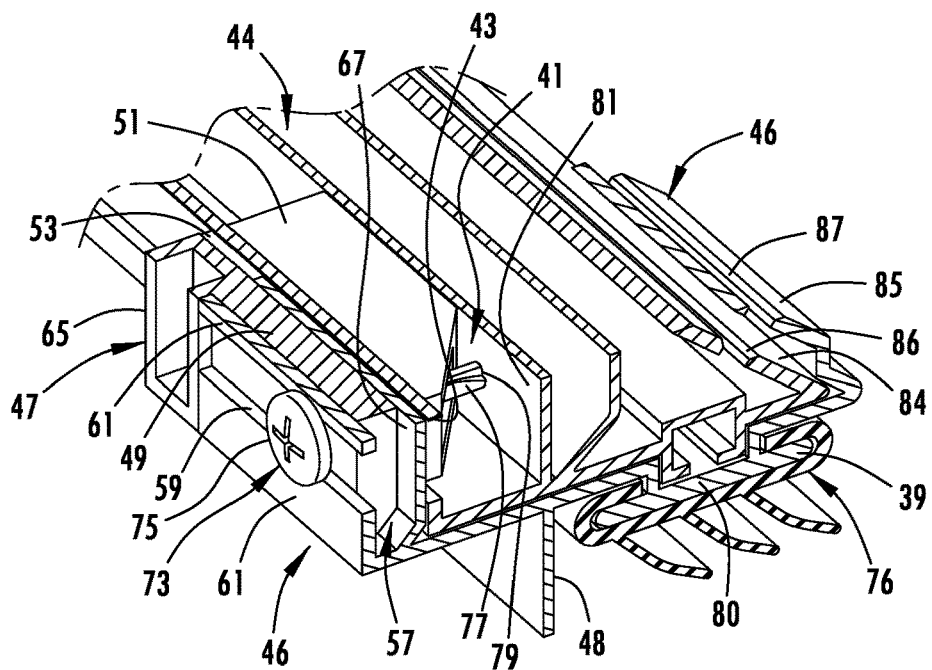

As seen in FIG. 14, the adapter block 47 includes two slide members, an inner slide 49 and an outer slide 51. The slides 49, 51 are joined together by a bridge 53 provided at one end of the slides 49, 51. Accordingly, the slides 49, 51 are separated by slot 55 over the remainder of their lengths. The inner slide 49 is correspondingly shaped so as to be received in an inboard channel 57 provided in the outer member 46, as seen in FIGS. 5, 15 and 16. The channel 57 has a laterally facing opening 59 between opposed legs 61 and, thus, generally defines a T-slot in the outer member 46.

As a result of the bridge 53 and an enlarged head 65 adjacent thereto and from which the inner slide 49 extends, the adapter block 47 is limited as to how far it may be inserted into the end of the outer member 46 by abutment of the bridge 53 and head 65 with the terminal end of the outer member 46. As seen in FIGS. 15 and 16, the base wall 67 of the channel 57, which is the wall opposite of the opening 59 of the channel 57, is received within the slot 55 defined between the inner and outer slides 49, 51.

With the adapter block 47 mounted to the end of the outer member 46, the inner member 44 is slid into the outer member 46 and onto the outer slide 51. During insertion of the inner member 44 into the outer member 46, the outer slide 51 is received into the inboard channel 41 of the inner member 44 with the bridge 53 extending through the opening 43 of the channel 41.

A bore 69 is defined transversely through the inner slide 49 of the adapter block 47 so as to be aligned with the opening 59 of the outer member's inboard channel 57. A corresponding bore 71 is defined through the outer slide 51. Extending through the bores 69, 71 is a threaded fastener 73, such as a wood screw, machine screw, self-tapping screw, or similar article, which includes an enlarged head 75 with a shank 77 extending therefrom to a terminal end 79.

By extending the fastener 73 progressively through the opening 59 of channel 57, the bore 69 of the inner slide 49, the opening 43 of channel 41 and the bore 71 of the outer slide 51, the terminal end 79 of the fastener 73 can be brought into engagement with the base wall 81 of the channel 41 and operate as a set screw, forcing the outer slide 51 into fixed engagement with the legs 45 defining the opening 53 into the channel 41 of the inner member 44. Simultaneously, the inner slide 49 is pulled toward the base wall 76 of the channel 57 of the outer member 46, and the outer and inner members 44, 46 are fixed together.

The side and end rails 38, 40 are provided with an angled and slotted outboard walls 84, 85, the purpose of which is smoothly received the cover 32 there over and engage the cover with the rails 38, 40. The cross rails 42 do not require the angled and slotted outboard walls and are preferably be square or rectangular in cross section, but may have other shapes as well.

Because of the telescoping nature of the inner and outer members 44, 46, the side and end rails 38, 40 each have different standoff distances from the upper surface of the bed rails 24, bulkhead 20 and tailgate 22. Accordingly, different sealing strategies are used for the inner and outer members 44, 46.

Figure 9:
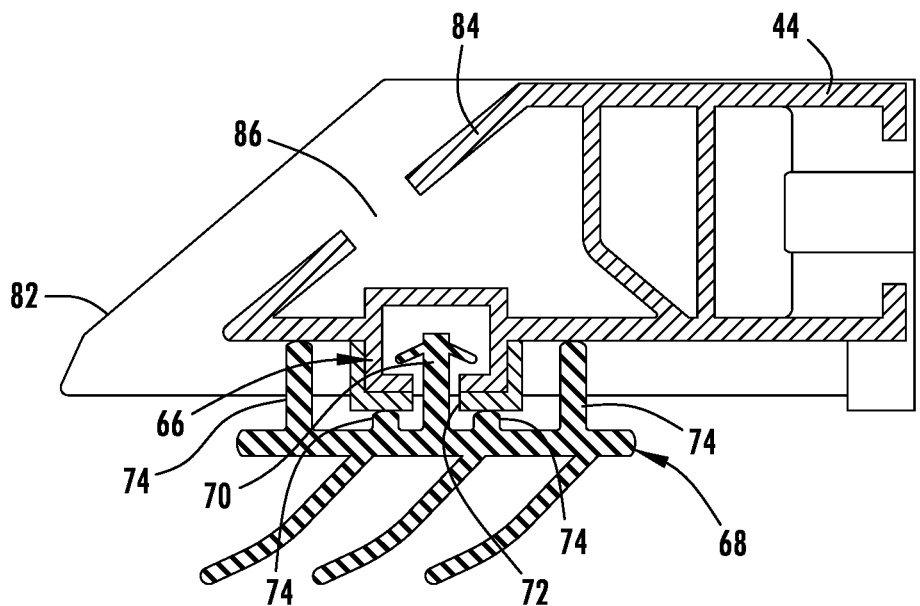
FIG. 9 is a cross sectional view showing a seal mounted to the inner member of a side or end rail.

The extrusion of the inner member 44 is formed with a channel profile 66 in the outboard side of the lower wall 62. (See FIG. 9) The channel profile 66 retains a snap-in seal 68 via a tree fastener 70, extending the length of the seal, pressed into the slot 72 of channel profile 66. Adjacent to the tree fastener 70 are protruding nubs 74 that engage the lower wall 62 and properly space the seal 68 relative thereto. The seal 68 is provided precut to the required dimensions of the pickup truck 14 and is installed by the end user.

The extrusion of the outer member 46 is formed with an inverted hat profile 39 in the outboard portion of its lower wall 63. (See FIGS. 6 and 10) The hat profile 39 retains a slide-on seal 76 via opposed gutters 78 that received extended ends 80 of the hat profile 39. The seal 76 is dimensioned to align with the seal 68 on the inner member 44. Notably, the channel profile 66 of the inner member 44 is received into a portion of the hat profile 39 when the members 44, 46 are telescoped with one another. The seal 76, like seal 68, may be provided precut to the required dimensions of the pickup truck 14 and may be preinstalled or installed by the end user.

The side and end rails 38, 40 are connected by corner members 82 that may be secured therebetween by fasteners or a press-fit engagement.

As will be appreciated from the above, once the width of the frame 30 is determined (as described above) and the detent springs 52 engaged in the end rails 40 and cross rails 42, the length of the side rails 38 may be similarly adjusted to the pickup truck's bed 12 or adjusted to a provided dimension for the specific pickup truck 14.

Contrary to the frame 30, which is adjustable, the cover 32 is specific to the pickup truck 14. The cover 32 may be shipped in the same box or a different box from the various members 44, 46 forming the rails 38, 40, 42.

As noted above, the angled outboard walls 84, 85 of the inner and outer members 44, 46 of the side rails 38 and end rails 40 are provided with slots 86, 87 extending along their lengths. The cover 32 is retained to the side and end rails 38, 40 by plastic fastener strips 88 sewn to the material of the cover 32. The fastener strips 88 include a tree fastener 90 that is pressed into the slots 86, 87 to retain the cover 32. Notably, the tree fastener 90 includes lips or branches 92 at differing positions along its trunk 94 enabling the fastener 90 to engage each of the inner and outer members 44, 46, simultaneously where they overlap or individually where they do not overlap. A cross sectional view of the fastener strip 88 and the tree fastener 90 is seen in FIG. 10.

At the center of the fastener strip 88, opposite of the base of the tree fastener 90, the fastener strip 88 is provided with an outwardly bowed profile 96. The bowed profile 96 keep tension on the tree fastener 90 and aids in its installation through the slots 86, 87 via pressing thereon. Along the upper and lower edges of the fastener strip 88, adjacent to the bowed profile 96, are provided raised profiles 98, 99. The raised profiles 98, 99 provide surfaces for the cover material to rest upon while preventing the cover material from applying pressure on the bowed profile 96.

Figure 12:
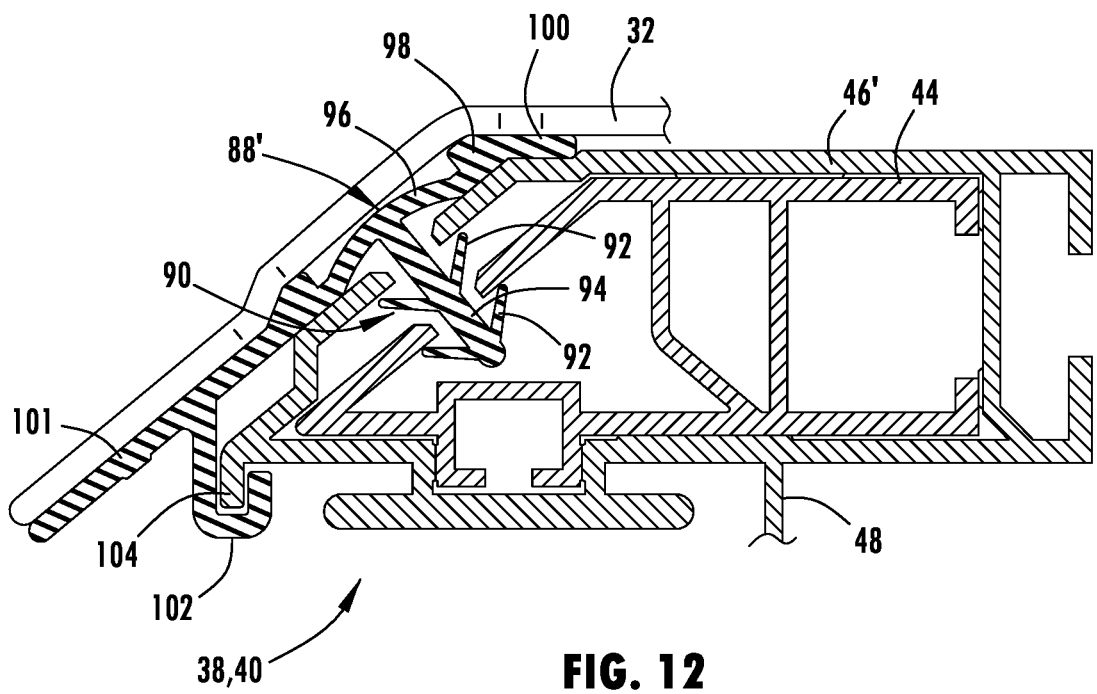
FIG. 12 is a cross sectional view, similar to FIG. 11, showing an alternative fastener used for securing a cover to the frame.
Figure 13:
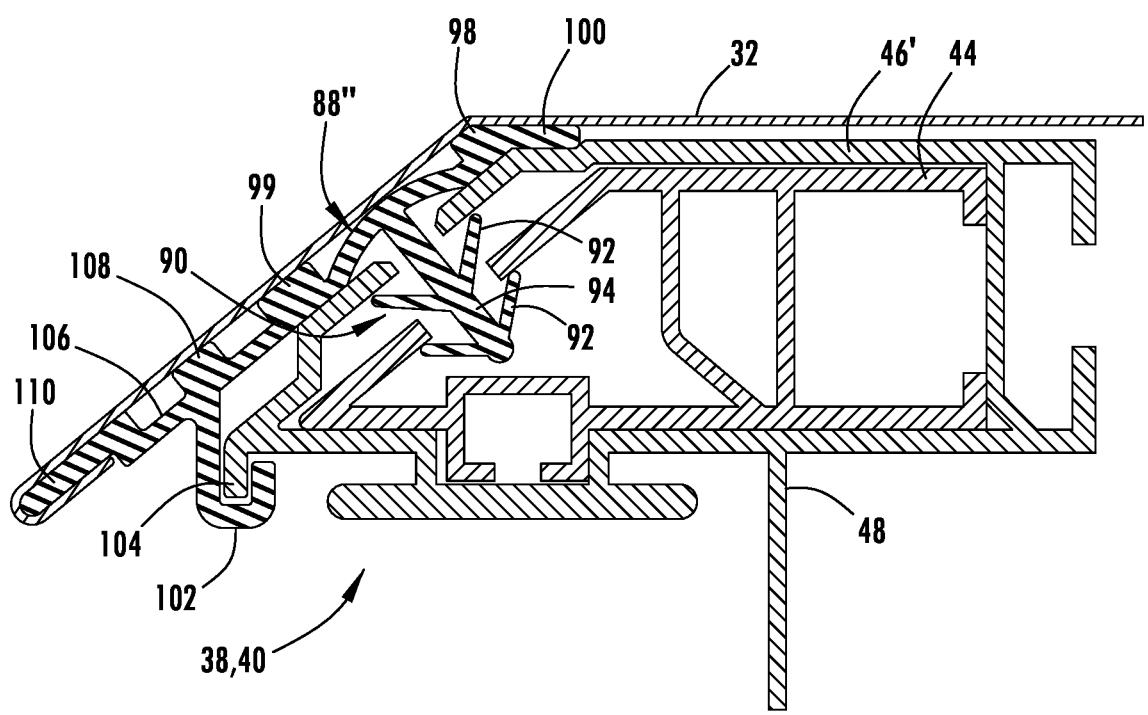
FIG. 13 is a cross sectional view, similar to FIG. 12, showing yet another alternative fastener used for securing a cover to the frame.

Alternative fastener strips 88', 88" and outer member 46' are seen in FIGS. 12 and 13, respectively.

The fastener strip 88' is provided with extended flanges 100, 101 off of the raised profiles 98, 99. A hook profile 102 is also provided off of the extended flange 101 to engage with a flange 104 provided along the outboard edge of the side rail 38. The extended flanges 100, 101 provided addition room for sewing of the material of the cover to the fastener strip 88', while the hook profile 102 provides support to the tree fastener 90 in retaining the cover 32 to the side and end rails 38, 40.

The fastener strip 88" includes extended flange 100 off of raised profile 98, but varies with respect to the extended flange off of the raised profile 99. Fastener strip 88" includes an extended flange 106 off of raised profile 99 that includes raised lands 108, 110, which define top surfaces that are flush with the top surface of raised profile 99. The flush top surfaces of the raised profile 99 and lands 108, 110 provide a series of coplanar surfaces that effectively form a flat surface for securement of the cover 32 to the fastener strip 88". This provides a flat appearance to the cover 32 at the fastener strip 88" and aids in stitching of the cover 32 to the fastener strip 88". Additionally, adhesive may be applied to these top surfaces of the fastener strip 88", as well as fastener strips 88 and 88', for further securing of the cover to the fastener strip 88". Like the embodiment of FIG. 12, a hook profile 102 is also provided off of the extended flange 106 to engage with a flange 104 provided along the outboard edge of the side rail 38.

In view of the above description, it will be appreciated that the frame 30 is adjustable for various sizes of beds 12 of pickup trucks 14. The frame's construction allows for the inner and outer members 44, 46 of the rails 38, 40 and 42 to be provided to the end user in a fully retracted or disassembled condition and allows the end user to assemble the frame 30 to required dimensions of the bed 12 of the end user's pickup truck 14. With the present tonneau cover and frame, the only components specific to a given make and model of a pickup truck, or a limited number of pickup trucks, is the cover 32. As a result, a manufacturer of tonneau covers 10 to provide a single frame 30 that is usable with many different pickup trucks 14, thereby reducing manufacturing and shipping costs. The present invention, also, amalgamates many tonneau cover models into one, semi-universal frame. This, therefore, reduces inventory and SKU requirements by dealers. The present invention, in one embodiment, would allow one frame to fit the beds of all North American pickup truck models.

Although the invention has been described with reference to certain specific embodiments incorporating the principles of the invention. One skilled in the art will readily appreciate that the invention is susceptible to modification, variation and change without departing from the true spirit and fair scope of the invention, as defined in the claims that follow. The scope of the claims should therefore not be limited by the preferred embodiments, but should be given the broadest interpretation consistent with the description as a whole. The terminology used herein is therefore intended to be understood in the nature of words of description and not words of limitation.

We claim:

1. A tonneau cover frame configured for use with a soft tonneau cover for a bed of a pickup truck, the frame comprising:

a plurality of sub-frames comprising at least a first sub-frame, a second sub-frame, and a third sub-frame, the first sub-frame comprising a pair of opposing adjustable side rails configured for extending along and securing to bed rails of the pickup truck, an adjustable end rail configured to be positioned on a bulkhead of the pickup truck and connecting the side rails of the first sub-frame together at a front end of the side rails, an adjustable cross rail configured to be positioned across a width of the bed of the pickup truck and connecting the side rails of the first sub-frame together at a middle portion of the side rails, the second sub-frame comprising a pair of opposing adjustable side rails configured to be positioned on the bed rails of the pickup truck, and an adjustable cross rail configured to be positioned across the width of the bed of the pickup truck and connecting the side rails of the second sub-frame together at a middle portion of the side rails, the third sub-frame comprising a pair of opposing adjustable side rails configured to be positioned on bed rails of the pickup truck, an adjustable end rail configured to be positioned on a tailgate of the pickup truck and connecting the side rails of the third sub-frame together at a rear end of the side rails, and an adjustable cross rail configured to be positioned across the width of the bed of the pickup truck and connecting the side rails of the third sub-frame together at a middle portion of the side rails;

a first hinge system that hingedly connects the side rails of the first sub-frame to the side rails of the second sub-frame;

a second hinge system that hingedly connects the side rails of the second sub-frame to the side rails of the third sub-frame, such that the first, second, and third sub-frames are foldable into a stack;

wherein the frame has an extended configuration and a knock-down configuration:

the extended configuration comprising:

the end rail, the side rails, and the cross rail of the first sub-frame in an extended position, the side rails and the cross rail of the second sub-frame in an extended position, and the end rail, the side rails, and the cross rail of the third sub-frame in an extended position, the knock-down configuration comprising:

the end rail, the side rails, and the cross rail of the first sub-frame in a collapsed position, such that a length of each of the end rail, the side rails, and the cross rail of the first sub-frame in the knock-down configuration is smaller than a corresponding length in the extended configuration, the side rails and the cross rail of the second sub-frame in a collapsed position, such that a length of each of the side rails and the cross rail of the second sub-frame in the knock-down configuration is smaller than a corresponding length in the extended configuration, and the end rail, the side rails, and the cross rail of the third sub-frame in a collapsed position, such that a length of each of the end rail, the side rails, and the cross rail of the third sub-frame in the knock-down configuration is smaller than a corresponding length in the extended configuration, wherein the first and second hinge systems maintain the hinged connection between the first and second sub-frames and between the second and third sub-frames in both the extended and knock-down configurations, whereby a flexible tarp is configured to be secured to the frame in the extended configuration and the frame is adjustable in length and width for use in connection with differently sized beds of different pickup trucks.

2. The frame according to claim 1, wherein at least one of the end rails or one of the cross rails includes an inner member and an outer member, the inner and outer members being in telescoping engagement with one another.

3. The frame according to claim 2, wherein at least one of the end rails or one of the cross rails includes two inner members and one outer member, the two inner members being engaged with opposing ends of the outer member.

4. The frame according to claim 1, wherein the end rails and the cross rails each include an engagement member, the engagement members selectively fixing the length of the end rails and cross rails.

5. The frame according to claim 4, wherein the engagement member is carried by a first portion of the end and cross rails and fixedly engages a second portion of the end and cross rails.

6. The frame according to claim 5, wherein the engagement member is a detent.

7. The frame according to claim 1, wherein each of the end rails includes an inner member and an outer member, the inner and outer members being in telescoping engagement with one another and selectively positionable in at least first and second lengths.

8. The frame according to claim 7, wherein each of the side rails includes an inner member and an outer member, the inner and outer members being in telescoping engagement with one another and selectively positionable in at least first and second lengths.

9. The frame according to claim 1, wherein each end rail and each cross rail is a telescoping rail selectively positionable in at least first and second lengths.

10. The frame according to claim 1, wherein the side rails are telescoping rails selectively positionable in at least first and second lengths.

11. A tonneau cover assembly for use with a bed of a pickup truck, the tonneau cover assembly comprising:

a frame comprising the plurality of sub-frames of claim 1;

a flexible cover, the cover being of fixed length and width configured to be secured to the frame in the extended position of the frame.

12. The tonneau cover assembly according to claim 11, wherein at least one of the end rails or one of the cross rails includes an inner member and an outer member, the inner and outer members being in telescoping engagement with one another and being selectively positionable in at least first and second lengths.

13. The tonneau cover assembly according to claim 11, wherein the side rails include an inner member and an outer member, the inner and outer members being in telescoping engagement with one another and being selectively positionable in at least first and second lengths.

14. The tonneau cover assembly according to claim 13, wherein the side rails include an adapter block engaged between the inner member and the outer member and preventing relative movement therebetween.

* * * * *